US006267039B1

(12) United States Patent
Czarnecki

(10) Patent No.: US 6,267,039 B1
(45) Date of Patent: Jul. 31, 2001

(54) AIRCRAFT MISSILE-HIT SURVIVABILITY USING INFRARED LAMP AND SACRIFICIAL SUPPORT STRUCTURE

(75) Inventor: Gregory J. Czarnecki, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/501,288

(22) Filed: Feb. 9, 2000

(51) Int. Cl.[7] .................................................. B64D 1/04
(52) U.S. Cl. ...................... 89/1.11; 250/495.1; 342/14; 244/3.16
(58) Field of Search ..................... 89/1.11; 250/495.1; 342/14; 244/3.16

(56) References Cited

U.S. PATENT DOCUMENTS

| 5,129,323 | 7/1992 | Park ..................................... 102/293 |
|---|---|---|
| 5,166,507 | * 11/1992 | Davis et al. . |
| 5,406,287 | 4/1995 | Pinkus ..................................... 342/13 |
| 5,565,645 | 10/1996 | Tannan, II et al. ................... 102/336 |
| 5,571,621 | 11/1996 | Stevens et al. ....................... 428/389 |
| 5,600,434 | * 2/1997 | Warm et al. . |
| 5,703,314 | * 12/1997 | Meeker . |
| 5,895,882 | 4/1999 | Woodall, Jr. ......................... 102/341 |
| 6,123,288 | * 9/2000 | Kenyon . |

* cited by examiner

*Primary Examiner*—Charles T. Jordan
*Assistant Examiner*—Troy Chambers
(74) *Attorney, Agent, or Firm*—Gina S. Tollefson; Gerald B. Hollins; Thomas L. Kundert

(57) ABSTRACT

An aircraft missile vulnerability reduction system based on missile hit acceptance whereby a targeted aircraft's most critical components are protected by a preprogrammed, missile-attracting infrared decoy strategically positioned on a sacrificial portion of the aircraft's structure. The decoy is optimally located based on vulnerability analyses and includes multiple modes of operation that configure to instantaneous survivability needs. The system is capable of providing aircraft survivability against shoulder launched man-portable air defense systems missiles during low-level mission flight scenarios.

19 Claims, 5 Drawing Sheets

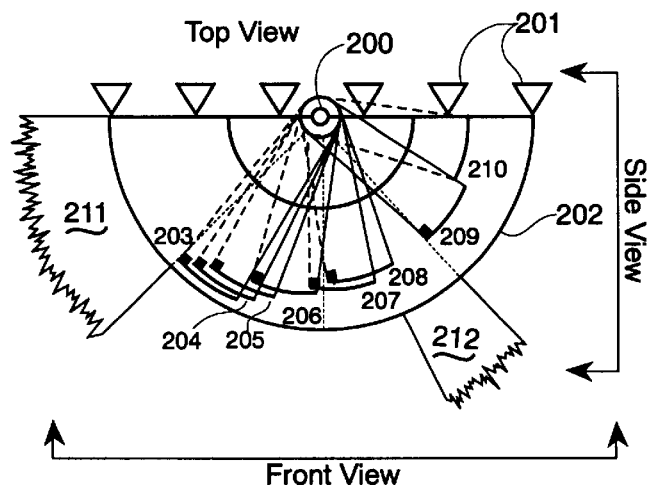
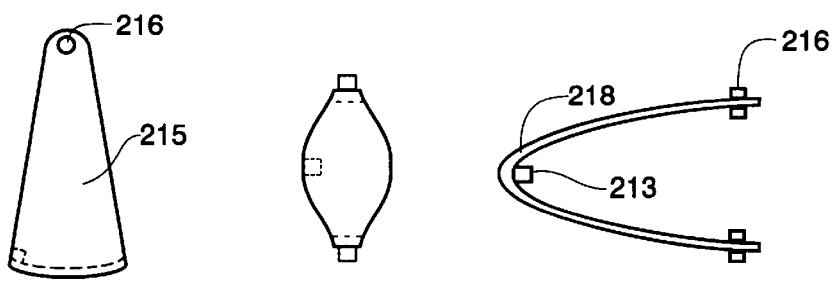
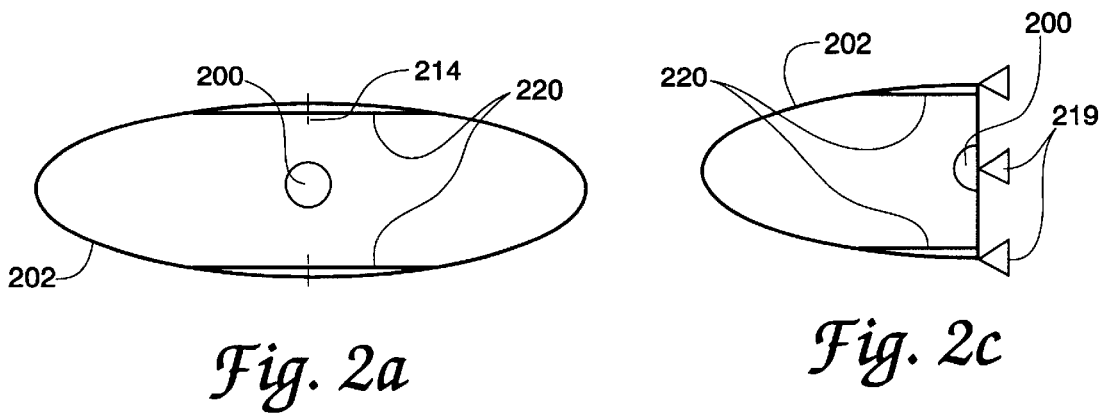
Fig. 2
Fig. 2b
Fig. 2d
Fig. 2e
Fig. 2a
Fig. 2c

AIRCRAFT MISSILE-HIT SURVIVABILITY USING INFRARED LAMP AND SACRIFICIAL SUPPORT STRUCTURE

RIGHTS OF THE GOVERNMENT

The invention described herein may be manufactured and used by or for the government of the United States for all governmental purposes without the payment of any royalty.

BACKGROUND OF THE INVENTION

The field of the invention is aircraft survivability to infrared missiles. More specifically, the invention provides vulnerability reduction (hit acceptance) by coaxing missiles away from critical aircraft components and toward sacrificial structure using an infrared decoy.

Conventional, prior art, vulnerability reduction techniques such as onboard fire extinguishers, reticulated foam, and damage resistant structures applied to present-day aircraft generally provide a reasonable level of protection against, respectively, fuel fires, ullage explosions, and hydrodynamic ram caused by bullets and individual missile fragments. However, as presently applied, these vulnerability reduction features cannot be considered fully capable of insuring aircraft survivability against the direct hits of shoulder-launched Man Portable Air Defense System (MANPADS) missiles. Conventional vulnerability reduction features are often overmatched by the hit-to-kill MANPADS munitions containing ten-times the explosive charge weight of common anti-aircraft artillery (AAA) munitions and up to 100-times the mass.

In recent years, the infrared MANPADS threat has been widely proliferated throughout the world. Attempts to achieve aircraft survivability in response to MANPADS have commonly centered on susceptibility reduction (hit avoidance) features. A prior-art susceptibility reduction feature is the towed RF (radar) decoy. The tow-cable length is set long enough so that the aircraft is outside the kill radius for any missile detonating near the decoy. A towed decoy, however, has several limitations. While surface-to-air missiles (SAMs) may be guided to the RF decoy, the missile's proximity fuse may, by chance, detonate between the aircraft and decoy, causing an aircraft kill. Although the tow cable can be made longer to avoid such a problem, weight and on-board volumetric storage requirements become an issue. Further, regardless of cable length, aircraft operating at low altitudes will attract barrages of AAA fire. Although susceptibility reduction philosophy emphasizes avoiding detection and avoiding a hit, an RF (or dumb IR) decoy will attract continuous attention from a variety of SAM and AAA systems. Under low-altitude circumstances, hits may therefore occur with a high degree of frequency.

An example prior-art operational vulnerability reduction system is the sacrificial engine-nozzle extension applied several years ago to Israeli A-4 aircraft. IR-seeking missiles attracted to this hot-spot location destroyed only the sacrificial extension. Flight-critical engine components were protected. Limitations of the nozzle extension concept are that 1) the sacrificial extension can involve considerable weight, 2) the cost of retrofit on most aircraft types is prohibitively high, 3) the extension is not easily adapted to thrust vectoring aircraft, 4) without an extremely long nozzle extension the aircraft's empennage may remain susceptible to damage, 5) the nozzle extension can increase beam-aspects of the aircraft's thermal signature, and 6) missiles approaching directly from the rear can retain sufficient forward kinetic energy to damage critical engine components.

While prior art MANPADS has focused on hit avoidance, aircraft encounters with MANPADS throughout the past 40 years have clearly demonstrated that hit avoidance is not always possible. Furthermore, aircraft flying at extreme altitudes to avoid missile hits may result in mission compromise.

As an alternative or in addition to vulnerability reduction including hit avoidance features is vulnerability reduction including hit acceptance features. The method and device of the invention involves a decoy infrared lamp installed on a sacrificial support structure. Together, they will increase aircraft survivability to MANPADS missile hits by protecting the targeted aircraft's most critical components. The invention also provides susceptibility reduction in that approaching missiles are coaxed away from the aircraft's most critical zones.

SUMMARY OF THE INVENTION

A vulnerability reduction system is provided whereby a targeted aircraft's most critical components are protected by a missile-attracting infrared decoy strategically positioned on a sacrificial portion of the aircraft's structure. The decoy is optimally located based on vulnerability analyses and includes multiple modes of preprogrammed operation. During low-level mission flight scenarios the system will provide a large measure of aircraft survivability to IR MANPADS threats.

It is therefore an object of the invention to provide a missile threat hit acceptance vulnerability reduction system.

It is another object of the invention to provide an aircraft survivability missile threat hit acceptance vulnerability reduction system operable at low level mission flight scenarios.

It is another object of the invention to provide a missile threat vulnerability reduction system using a preprogrammed infrared lamp as a decoy.

It is another object of the invention to provide a missile threat vulnerability reduction system using a sacrificial support structure for supporting the infrared lamp decoy.

It is another object of the invention to provide a missile hit vulnerability reduction system capable against man portable air defense systems shoulder launched missiles.

It is another object of the invention to provide a missile threat vulnerability reduction system that directs approaching MANPADS infrared missiles to an aircraft's least vulnerable location.

These and other objects of the invention are described in the description, claims, and accompanying drawings and are achieved by a mode selectable, preprogrammable, aircraft missile hit vulnerability reducing system comprising:

an infrared light source;

a plurality of computer controlled directional light emission controlling shutters surrounding said infrared light source;

connecting means securing said infrared light source and said plurality of light emission controlling shutters to an aircraft sacrificial support structure; and an aircraft pilot input responsive computer processing unit controlling mode and operation of said infrared light source and said directional light emission controlling shutters producing an aircraft thermal signature corresponding to mission requirements.

DESCRIPTION OF THE DRAWINGS

FIG. 2 shows a top view of an infrared lamp system, according to the invention, with a second shutter assembly.

FIG. 2a shows a front view of the infrared lamp of FIG. 2 without the second shutter assembly.

FIG. 2b shows a top view a single shutter of the second shutter assembly of FIG. 2.

FIG. 2c shows a side view of the infrared lamp system of FIG. 2.

FIG. 2d shows a front view of the single shutter of FIG. 2b.

FIG. 2e is a side view of the single shutter of FIG. 2b.

DETAILED DESCRIPTION OF THE INVENTION

The device and method of the invention is a hit-acceptance vulnerability reduction system providing increased aircraft survivability against MANPADS. The method and device of the invention includes a preprogrammable decoy infrared lamp attached to a sacrificial support structure. The invention directs the location of a missile hit to a pre-selected aircraft sacrificial support structure. This is in contrast to prior-art missile vulnerability reduction systems that do not direct hit-points and often result in hits at aircraft critical locations. A significant aspect of the invention, therefore, is to sacrifice, rather than protect, a specific aircraft structure. As such, the sacrificial structure is ideally designed for easy repair or replacement. The infrared lamp, according to the invention, operates in an intelligent fashion rather than in the continuous or uncontrolled fashion of prior-art systems. The infrared lamp and sacrificial support structure provides mission dependent and multi-mode operation tuned to specific aircraft requirements.

Figure 1:
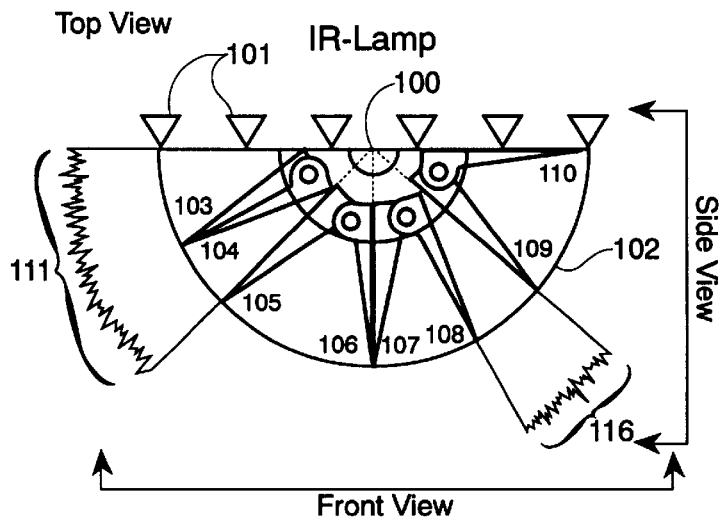
FIG. 1 shows a top view of an infrared lamp system, according to the invention, with a first shutter assembly.

FIG. 1 shows a top view arrangement of the invention where directional emission of the infrared lamp source is controlled by a clam-shell shutter assembly within a transparent housing 102. The invention is not limited to the clam-shell shutter assembly arrangement of FIG. 1, but is operable with any infrared light emission controlling shutter assembly. The infrared lamp source is shown at 100 in FIG. 1 and lamp attachment to an aircraft or its sacrificial support structure is represented by triangles, two of which are identified at 101. The decoy infrared lamp 100 is strategically positioned on a sacrificial component of the aircraft. If an inherently suitable sacrificial component cannot be identified, the aircraft can be fitted with a sacrificial structural appendage to generate a condition of high IR-signature visibility and a low level of aircraft vulnerability (a low probability of aircraft kill) if hit.

As shown in FIG. 1, the transparent housing 102 encasing the infrared lamp source 100 includes clam shell-like shutter halves at 103, 104, 105, 106, 107, 108, 109, and 110. The shutters operate in an open-close fashion much like clam shells to control and direct infrared light emission from the infrared lamp 100. In the arrangement of FIG. 1, shutter halves 103 and 104 are fully open to allow infrared emissions over a 45-degree angle, such emission is represented at 111 in FIG. 1. Shutter-half 108 is almost fully open in the arrangement of FIG. 1, allowing infrared emissions over a 20-degree sector, as represented at 116. Shutter halves 105, 106, 107, 109, and 110 are fully closed in the arrangement of FIG. 1. The decoy infrared lamp 100 is positioned to attract incoming missiles to the aircraft's least vulnerable location, a sacrificial support structure, thereby improving aircraft hit survivability.

It is known in the art that aircraft are generally hit from the back. The back of the aircraft has the highest thermal signature from the aircraft engine and exhaust components, that is, the aircraft's thermal signature is more intense, and is therefore more attractive to heat seeking missiles. Additionally, an aircraft's whereabouts are often not known until after it drops a payload and is exiting an area, making the rear of the aircraft susceptible to a retaliatory missile hit.

Figure 1B:
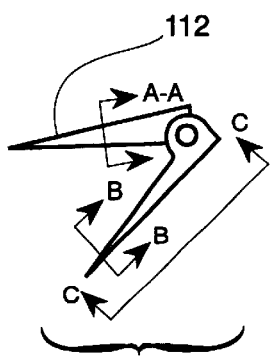
FIG. 1b shows a top view of a single shutter from the first shutter assembly of FIG. 1.
Figure 1D:
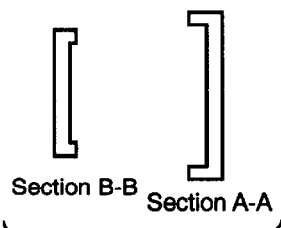
FIG. 1d shows a cross-sectional view of the single shutter of FIG. 1b.
Figure 1E:
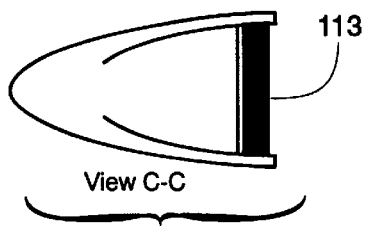
FIG. 1e shows a side view of a one-half of the single shutter of FIG. 1b.
Figure 1A:
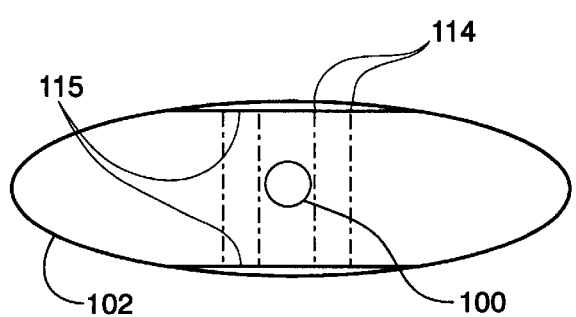
FIG. 1a shows a front view of the infrared lamp system of FIG. 1 without the first shutter assembly.

FIG. 1a is a front view of the FIG. 1 lamp housing without the clam-shell shutters. The infrared light source is shown at 100 and the transparent housing at 102. The thickened ledges at 115 represent not only a hinge support, but an opaque mask for IR light that might be emitted unintentionally through either the top or bottom of the otherwise-transparent housing. The dotted lines, two of which are identified at 114, represent hinge lines (pins) for the clam-shell shutters.

Figure 1C:
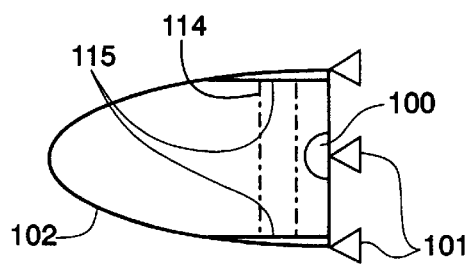
FIG. 1c shows a side view of the infrared lamp system of FIG. 1.

FIG. 1b is a top view of a single clam-shell shutter, in a closed configuration, of the clam-shell shutter assembly of FIG. 1. A single element (half) of a clam-shell shutter assembly is shown at 112 in FIG. 1b with a cross-sectional view of the same shown in FIG. 1d. FIG. 1c is a side view of the FIG. 1 lamp housing without the clam-shell shutters. The dashed lines at 114 represent hinge lines for shutter pins that allow shutter rotation. The infrared lamp is shown at 100 and transparent housing at 102. Housing attachment to the support structure is shown by the triangles of 101. The thickened ledge at 115 represents a hinge support and masks IR light that might otherwise be emitted. FIG. 1e shows a side view of a single shutter-half from FIG. 1b. The hinge pin is shown at 113.

FIG. 2 shows a top view of the method and device of the invention with a second shutter arrangement. Attachment to an aircraft or sacrificial support structure is represented by triangles, two of which are identified at 201. The infrared lamp element is shown at 200, the transparent housing is shown at 202, and the fan-like shutters are shown at 203, 204, 205, 206, 207, 208, 209, and 210. The shutters are graded in size with 210 being the smallest and 203 being the largest in the arrangement of FIG. 2. Additionally, the shutters are offset and fold into each other as they are rotated. In the arrangement and preselected mode of FIG. 2, shutters 203 and 204 are fully open to allow infrared emission over a 45-degree sector. Such emission is represented at 211. Shutter 208 is almost fully open allowing infrared emission over a 20-degree sector. Such emission is represented at 212. Shutters 205, 206, 207, 209, and 210 are fully closed.

FIG. 2a shows a front view of the infrared lamp system's transparent housing of FIG. 2 without the fan-like shutters. The transparent housing is at 202. The infrared lamp source is shown at 200 and the hinge line for the fanlike shutters is represented at 214. The thickened ledges at 220 represent not only a hinge support, but a mask for IR light that might be emitted unintentionally through either the top or bottom of the otherwise-transparent housing. FIG. 2b is a top view of a single fan-like shutter from FIG. 2. The single shutter is shown at 215, and the hinge-pin shown at 216. FIG. 2c shows a side view of the infrared lamp system of FIG. 2 without the fan-like shutters. The infrared light source is at 200 and the transparent housing at 202. The aircraft, or sacrificial support structure, connecting elements are represented at 219. The thickened ledge at 220 is a hinge support and mask to prevent unintentional IR light escape. FIG. 2d shows a front view of the single shutter of FIG. 2b. FIG. 2e is a side view of the single shutter of FIG. 2b, with the shutter shown at 218, the shutter-stop at 213, and the hinge-pin at 216.

Figure 3:
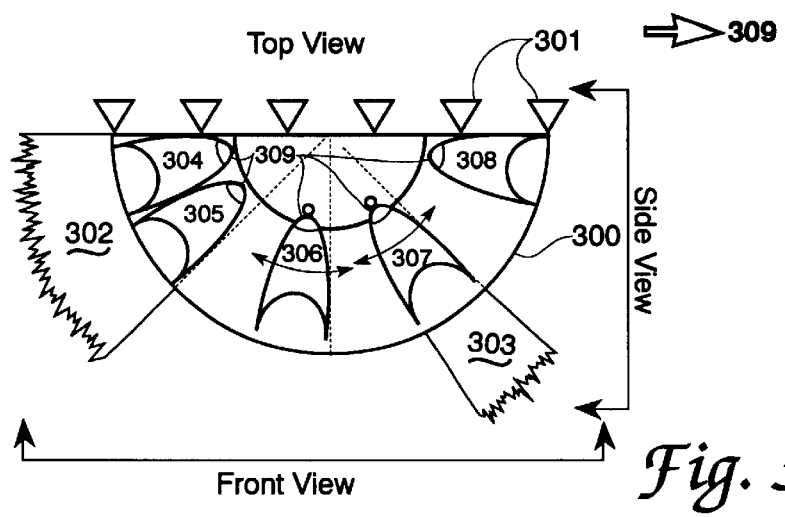
FIG. 3 shows a top view of an infrared lamp system, according to the invention, with fixed and rotating reflector assemblies.

FIG. 3 shows an alternative arrangement of the method and device of the invention comprising several infrared lamp sources. This is in contrast to the arrangements of FIGS. 1 and 2 where there is only a single lamp source. The FIG. 3 arrangement consists of separate infrared elements 309 connected to several parabolic reflectors shown at 304 through 308. Means for attaching the device to the aircraft sacrificial support structure are represented by the triangles at 301. In the mode selected for the FIG. 3 arrangement of the invention, the infrared sources in fixed reflectors 304 and 305 are active and distributing emissions over a 45-degree angle, represented at 302. The infrared source at reflector 307 is also active. Selected reflector 307 is pivotable and distributing emissions over a 22-degree sector, represented at 303. The infrared sources at moveable reflector 306 and fixed reflector 308 are in the off mode. Assuming the arrangement of FIG. 1 is attached to an aircraft which is going forward in a right-handed direction in the direction of designation numeral 309, reflectors 304 and 305 are fixed because aircraft mission scenarios generally require an aft-facing infrared decoy emission after dropping a payload and beginning to exit the target area. Similarly, after a first payload has been dropped and the enemy becomes alerted, follow-on aircraft activity in the area may require the front-facing emission provided by the reflector at 308.

Figures 3B, 3D, 3E, 3F:
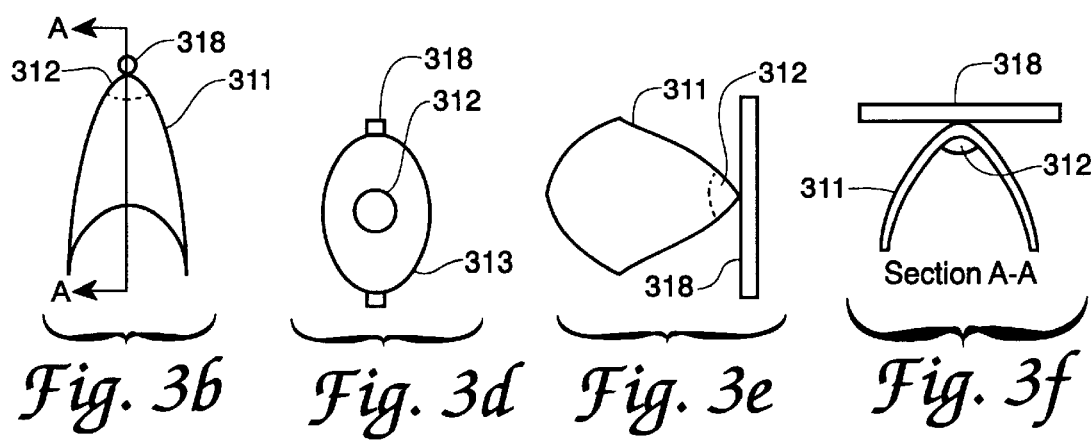
FIG. 3b shows a top view of a single rotating parabolic reflector assembly of FIG. 3.
FIG. 3d shows a front view of the single parabolic reflector of FIG. 3b.
FIG. 3e shows a side view of the single parabolic reflector of FIG. 3b.
FIG. 3f shows a cross-sectional view of the single parabolic reflector of FIG. 3b.
Figures 3A, 3C:
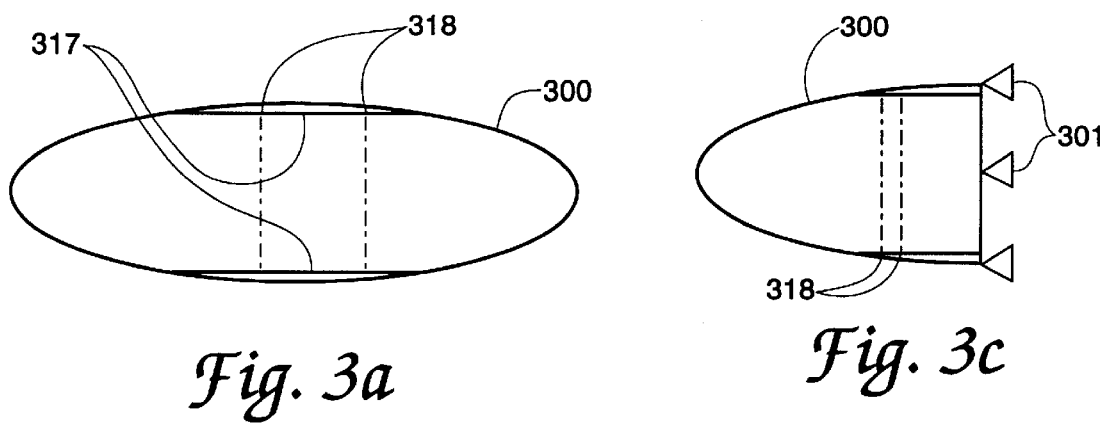
FIG. 3a shows a front view of the infrared lamp system of FIG. 3 without the fixed and rotating reflector assemblies.
FIG. 3c shows a side view of the infrared lamp system of FIG. 3.

FIG. 3a is a front view of the arrangement of the FIG. 3 apparatus without the parabolic reflectors. The transparent housing is shown at 300 and possible parabolic reflector hinge pivot lines shown at 318. The thickened ledges at 317 represent not only a hinge support, but a mask for IR light that might be emitted unintentionally through either the top or bottom of the otherwise-transparent housing. Notice that there is no single infrared light source (as depicted in FIGS. 1a and 2a) since the FIG. 3 system incorporates an infrared source within each reflector.

FIG. 3b shows a top view of a single parabolic reflector system from the arrangement of FIG. 3. The reflector is at 311, the infrared lamp source at 312, and a rotatable connector shown at 318. A front view of the single parabolic reflector system of FIG. 3b is shown in FIG. 3d with an infrared lamp source shown at 312, the reflector at 311, and the hinge pin at 318. FIG. 3e is a side view of the single parabolic reflector system of FIG. 3b. The infrared source is at 312, the reflector at 311, and the hinge pin at 318 FIG. 3e. Finally, FIG. 3f is a cross-sectional view of the single parabolic reflector system of FIG. 3b. The infrared source is at 312, the reflector at 311 and the hinge pin at 318.

In the device and method of the invention, the targeted aircraft's most critical components are protected by a decoy infrared (IR) source strategically positioned on a sacrificial portion of the structure. Optimal location of the decoy infrared lamp is attained by 1) performing a vulnerability analysis of the aircraft to identify least vulnerable areas remote from highly vulnerable areas, and 2) identifying which of the least-vulnerable areas are also highly "visible" to probable missile approach directions and don't involve shotlines passing near highly vulnerable areas. Because the lamp is designed to attract incoming missiles, care is taken to avoid affecting overall aircraft susceptibility.

Infrared lamp operation is preprogrammed and restricted for use only during mission segments when the aircraft is likely to be hit. Because lamp operation is preprogrammed in emission time, direction, and intensity based on conditional threshold requirements, input from a missile warning system is not required. Once activated, the lamp's emissions are directed toward the most-probable missile approach angle. Emission wavelengths are designed to match those that the missile seeks. Lamp output is matched to the aircraft's thermal signature with the intensity set sufficiently low to attract locked-on missiles without generating additional lock-ons.

Figure 4:
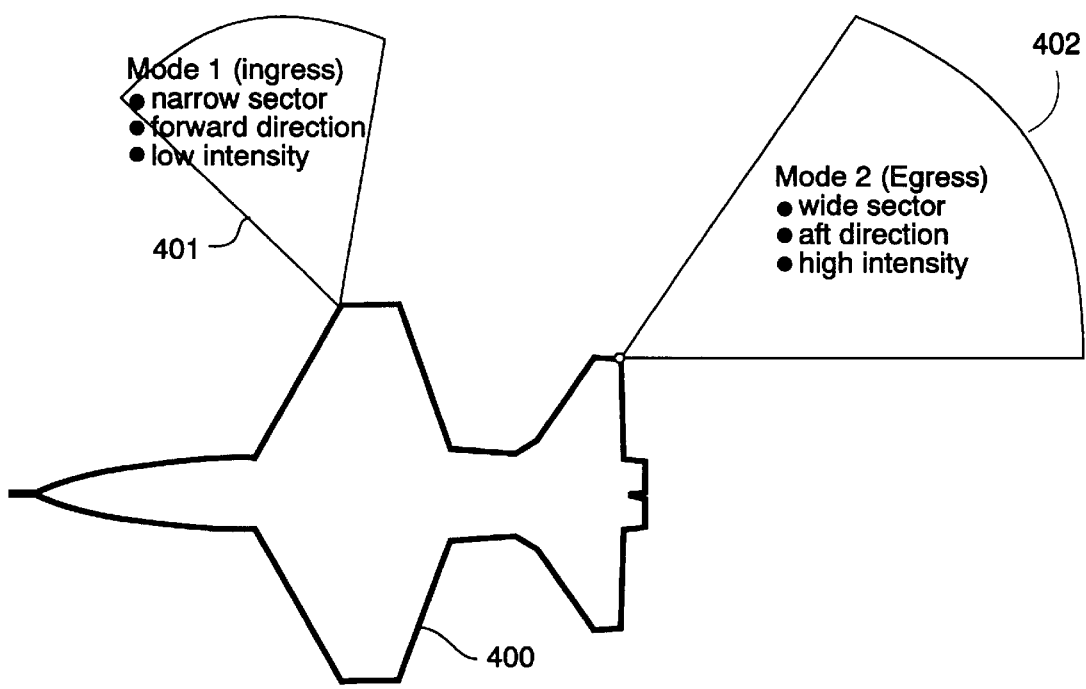
FIG. 4 shows representative operational modes of the infrared lamp system according to the invention.

In order to conform to aircraft and mission, the lamp's design includes multiple modes of operation driven by a logic-circuit receiving feeds from the aircraft's altimeter, airspeed indicator, countermeasure status, and other data. Modes of operation will be pre-programmed according to aircraft and mission requirements. FIG. 4 provides an overview of possible modes of IR lamp operation. An aircraft is shown at 400 with an ingress mode of IR lamp emission represented by the area at 401 and an egress mode represented by the area at 402. As shown in FIG. 4, the Ingress mode of lamp operation involves a narrow sector, forward direction, and low intensity. The Egress mode at 402 involves a wide sector, aft direction and high intensity.

Figure 5:
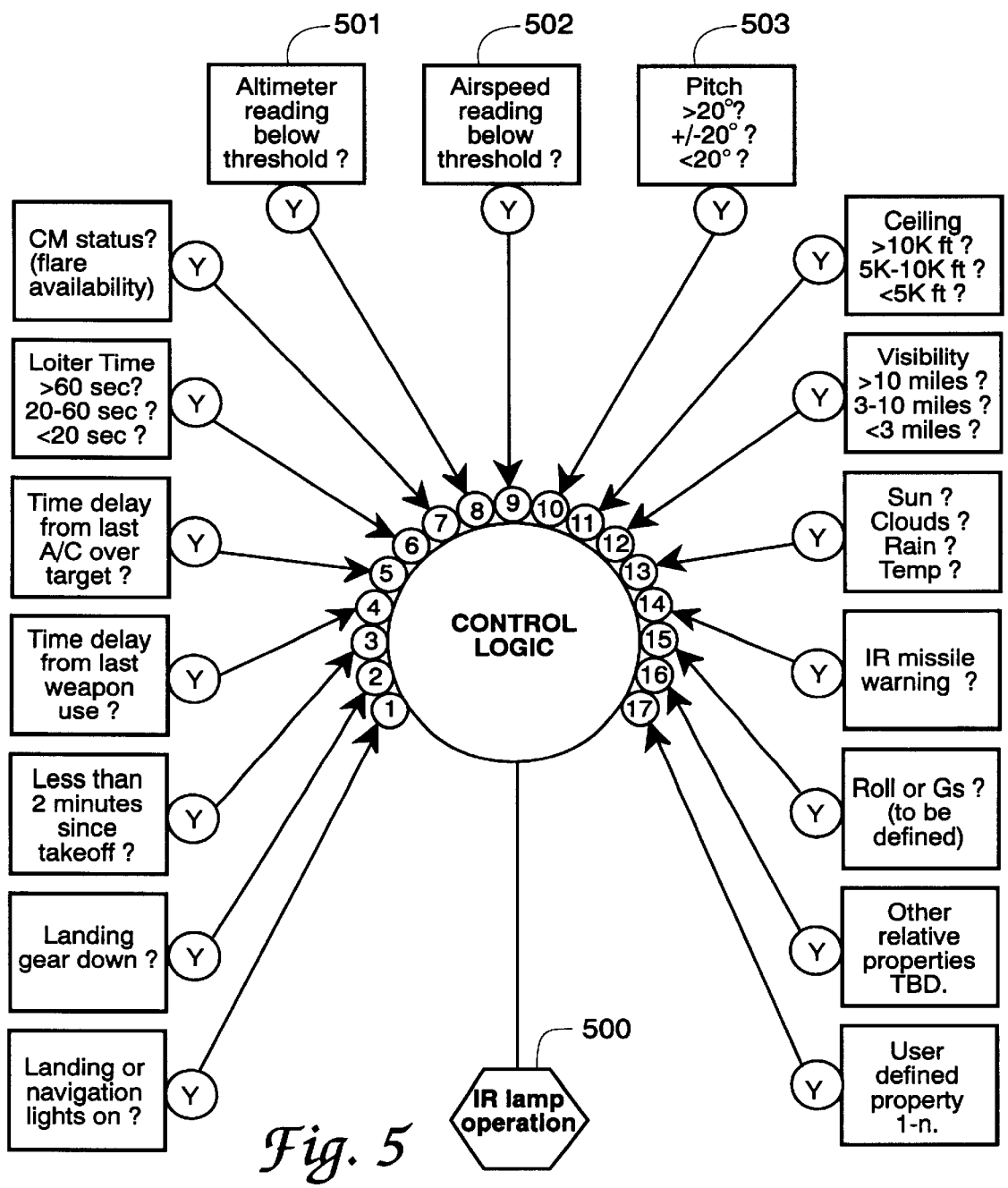
FIG. 5 shows infrared lamp operation according to the invention based on inputs to an established control logic.
Figure 6:
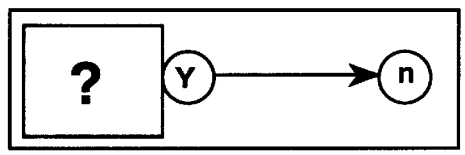
FIG. 6 shows a block diagram of conditional statement symbology according to the invention.

FIG. 5 shows infrared lamp operation based on inputs to an established control logic. Operation of the IR lamp (500) is based on the aircraft's current operational status such as altitude represented at 501, airspeed represented at 502, pitch represented at 503. Operation may also consider weapon-status, countermeasure-status, and several other parameters. Input from each of these feeds are subjected to a conditional statement which, if true, will turn a "key" in the control logic. FIG. 6 shows an example conditional statement symbology. When an appropriate key-sequence is turned, the lamp will turn-on and be directed (according to angle and intensity) in a pre-planned fashion. Lamp operation may continue until redirected by another key-sequence. While keys are continuously switched on and off during flight, only specific sequences allow lamp operation for a pre-planned time, direction, and intensity. For commercial aircraft applications, lamps may be directed to turn-on and stay on whenever the aircraft is below a threshold altitude. Operation in this case can be either manual or automatic.

To employ the device and method of the invention with any given aircraft, a structure that does not contain critical subsystems, particularly near aircraft extremities, is first identified. Next, a vulnerability assessment is performed using an IR missile damage template. Probable missile approach directions are considered to identify hit points on the structure that will prove least catastrophic to the aircraft. Care is also taken to insure probable shotlines will not pass in proximity of highly critical components. Of the least catastrophic hit points (involving least threatening shotlines), those that provide the greatest degree of visibility from all possible missile approach angles are identified for potential lamp placement.

The feasibility of placing an IR lamp at any of the least critical and highly visible locations is next considered. For military applications, potential lamp locations must be meshed with the aircraft's susceptibility reduction features. Finally, one or more lamp locations that meet the above criteria are selected. For military aircraft, lamp frequencies and intensities (as a function of direction) are selected that do not significantly increase the aircraft's thermal signature, but are sufficient to attract an in-coming IR missile. Potential modes of lamp operation that maximize aircraft survivability (a combination of susceptibility reduction and vulnerability reduction) should be identified. For commercial aircraft, an economical and omnidirectional lamp (IR source) is selected that is capable of generating light frequencies and intensities to insure missile attraction.

A special advantage of the device and method of the invention designed for military applications is that the prescribed infrared lamps are designed to work in conjunction with existing susceptibility reduction features, not diminish from them. That is, instead of redirecting aircraft infrared sources, an infrared source is installed or retrofitted on an aircraft. The IR beacon will illuminate sectors of potential missile approach which are not easily handled by existing countermeasures. Lamp intensities, directions, and modes of operation are intelligently controlled and balanced with the aircraft's thermal signature and available countermeasures. The lamp also provides special measures of protection during takeoffs and landings when aircraft (even stealth aircraft) may be susceptible to hits.

In the case of commercial aircraft, the infrared lamp's continuous high-intensity operation at low altitudes provides the sole means of protection against terrorist-launched MANPADS. The low-tech commercial design provides an extra advantage of allowing flights into any airport in the world without the risk of compromising classified (or otherwise high-tech) U.S. technology. Should the method and device of the invention be considered for commercial aircraft, emphasis should be on simple bulb replacements in least-vulnerable locations, such as wing tip lights for example. In such case, high-intensity replacement bulbs may also require modifications to the existing socket, wiring, and housing.

Application of the method and device of the invention to helicopters requires special attention. It can be argued that helicopters do not have a least-vulnerable area that is capable of accepting a MANPADS hit. Accordingly, the aircraft's structure must be modified to include a pole-like appendage. When attached to the end of the pole, the lamp's stand-off from critical aircraft components will be sufficient to prevent an aircraft kill given a hit.

Should large-warhead IR threats be of particular concern, hits on or immediately adjacent to the aircraft may not be acceptable. In this case, a towed version of the prescribed IR lamp may be warranted.

Advantages to the method and device of the invention are that missile hits are directed to least-critical aircraft structures, normal modes of lamp operation auto-configure to aircraft and mission, special modes of operation allow continued protection during take-offs and landings, and the concept is adaptable to all air platforms, including military and commercial. The IR lamp concept offers a robust low-cost/weight and MANPADS-capable vulnerability reduction solution for all aircraft. Should a missile be attracted to an aircraft solely as a result of IR lamp operation, the low-risk hit point assures a high probability of aircraft survival.

Qualities of the method and device of the invention providing improvement over the prior-art systems include the ability to direct, rather than accept, missile hit locations, thereby avoiding harm to critical components. The infrared lamp according to the invention operates in an intelligent, rather than continuous/uncontrolled fashion, and as such, offers mission-dependent and multi-mode operation tuned to specific aircraft requirements. The intelligent lamp operation also supports susceptibility reduction goals of maintaining a low thermal signature and therefore not attracting ground fire.

The method and device of the invention is an enabling technology. By reducing the overall vulnerability reduction burden placed on STOVL aircraft, the IR lamp concept allows for the development of lowest-possible cost/weight designs. By directing hits to least vulnerable areas, operation of otherwise problematic aircraft (helicopters and CRAF) are allowed in MANPADS-controlled airspace. By disallowing hits in highly critical locations, the advancement of technologies associated with highly-integrated components can be pursued without having to pay a survivability penalty. By selecting desired hit locations, the prospects for designing useful fuse-insensitive structures increases.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. A mode selectable, preprogrammable, aircraft missile hit vulnerability reducing system comprising:
    an infrared light source;
    a plurality of computer controlled directional light emission controlling shutters surrounding said infrared light source;
    connecting means securing said infrared light source and said plurality of light emission controlling shutters to an aircraft sacrificial support structure; and
    an aircraft pilot input responsive computer processing unit controlling mode and operation of said infrared light source and said directional light emission controlling shutters producing an aircraft thermal signature corresponding to mission requirements.

2. The aircraft missile hit vulnerability reducing system of claim 1 wherein said infrared light source is a heat seeking missile attracting, computer controlled, mission dependent emission wavelength infrared light source.

3. The aircraft missile hit vulnerability reducing system of claim 1 further comprising a transparent housing enclosing said infrared light source and said plurality of directional light emission controlling shutters.

4. The aircraft missile hit vulnerability reducing system of claim 3 wherein transparent housing enclosed plurality of computer controlled directional light emission controlling shutters surrounding said infrared light source further comprises:

a plurality of clam-shell shutters with first and second members operatively connected with a hinge at a base, said being base in close proximity to said infrared light source; and computer controlled means of opening and closing said first and second members emitting infrared light therethrough.

5. The aircraft missile hit vulnerability reduction system of claim 3 wherein said transparent housing enclosed plurality of computer controlled directional light emission controlling shutters surrounding said infrared light source further comprises:

a plurality of fan shutters rotably connected to a hinge in close proximity to said infrared light source; and computer control means rotating said fan shutters and selectively emitting infrared light therethrough.

6. The aircraft missile hit vulnerability reduction system of claim 3 wherein said aircraft sacrificial support structure comprises a pole-like aircraft appendage.

7. The aircraft missile hit vulnerability reduction system of claim 3 wherein said aircraft sacrificial support structure comprises a towed appendage.

8. The aircraft missile hit vulnerability reduction system of claim 3 wherein said aircraft pilot input responsive computer processing unit controlling mode and operation of said infrared light source and said directional light emission controlling shutters producing an aircraft thermal signature corresponding to mission requirements further comprises a control logic algorithm comprising:

aircraft parameter indicators triggering activation of said infrared light source and an operation mode of said light emitting shutters including aircraft altitude, airspeed, pitch, weapons status, countermeasures status, time delay from last missile hit, weather, and landing gear status; and conditional logic means receiving said aircraft parameter indicators and indicating and terminating infrared lamp activation relative to said aircraft parameter indicators.

9. A mode selectable, preprogrammable, aircraft missile hit vulnerability reducing method comprising the steps of:

identifying a sacrificial support structure on a protected aircraft;

performing a vulnerability assessment using an missile damage template and probable missile approach directions to identify least catastrophic aircraft hit points on said sacrificial support structure;

placing an infrared lamp at a least critical and most optimized location on said sacrificial support structure; and selecting lamp operating frequencies and intensities minimizing a thermal signature of said aircraft and attracting infrared seeking missiles.

10. The mode selectable, preprogrammable, aircraft missile hit vulnerability reducing method of claim 9 wherein said identifying step further comprises identifying a sacrificial support structure near aircraft extremities void of critical subsystems.

11. The mode selectable, preprogrammable, aircraft missile hit vulnerability reducing method of claim 9 wherein said step of placing is followed by a step of providing computer controlled light emitting shutters enabling selectable light emission relative to specific mission scenarios.

12. The mode selectable, preprogrammable, aircraft missile hit vulnerability reducing method of claim 9 wherein said step of placing is followed by a step of enclosing said infrared lamp and computer controlled light emitting shutters within a transparent housing.

13. The mode selectable, prepreprogrammable, aircraft missile hit vulnerability reducing method of claim 9 wherein said selecting step further comprises:

determining known military and commercial applications;

providing computer programming with conditional logic to synthesize lamp operating frequencies and intensities and shutter operation with aircraft mission indicators to increase aircraft survivability.

14. The mode selectable, preprogrammable, aircraft missile hit vulnerability reducing method of claim 13 wherein said providing step further comprises providing computer programming with conditional logic to synthesize lamp frequencies and intensities and shutter operation with aircraft mission indicators including altitude, airspeed, pitch, weapons status, countermeasures status, landing gear status and weather to increase survivability.

15. A mode selectable, preprogrammable, aircraft missile hit vulnerability reducing system comprising:

a plurality of computer controlled parabolic reflectors;

a plurality of computer controlled infrared light sources each received in one of said parabolic reflectors;

a transparent housing enclosing said plurality of computer controlled parabolic reflectors;

connecting means securing said transparent housing to an aircraft sacrificial support structure; and an aircraft pilot input responsive computer processing unit controlling emission of said infrared light sources and position and angle of said computer controlled parabolic reflectors;

said emission of infrared light and infrared light wavelength and position and angle of said parabolic reflectors dependent on a desired thermal signature relative to mission requirements.

16. The mode selectable, preprogrammable, aircraft missile hit vulnerability reducing system of claim 15 wherein said aircraft pilot input responsive computer processing unit further comprises a control logic algorithm comprising:

aircraft parameter indicators triggering activation of said infrared light source and an operation mode of said light emitting shutters including aircraft altitude, airspeed, pitch, weapons status, countermeasures status, time delay from last missile hit, weather, and landing gear status; and conditional logic means receiving said aircraft parameter indicators and indicating and terminating infrared lamp activation relative to said aircraft parameter indicators.

17. The mode selectable, preprogrammable, aircraft missile hit vulnerability reducing system of claim 15 wherein said aircraft sacrificial support structure comprises a pole-like aircraft appendage.

18. The mode selectable, preprogrammable, aircraft missile hit vulnerability reducing system of claim 15 wherein said aircraft sacrificial support structure comprises a towed appendage.

19. The mode selectable, preprogrammable, aircraft missile hit vulnerability reducing system of claim 15 wherein said plurality of infrared light sources are heat-seeking missile attracting, computer controlled, mission dependent emission wavelength infrared light sources.

* * * * *